No. 710,128. Patented Sept. 30, 1902.
E. G. WATROUS.
WATER CLOSET VALVE.
(Application filed Dec. 26, 1899.)
(No Model.)
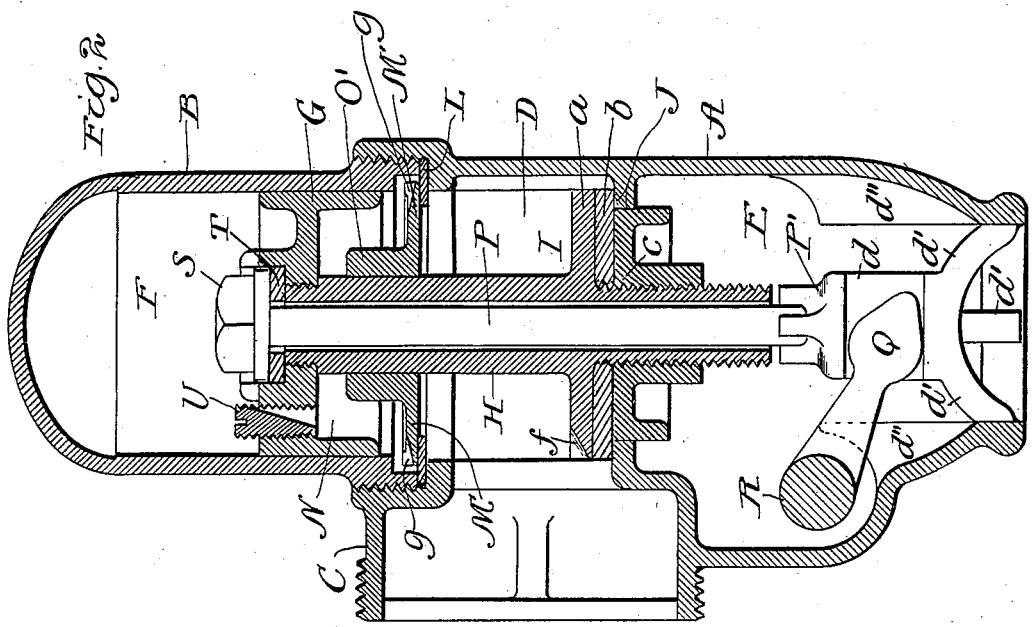
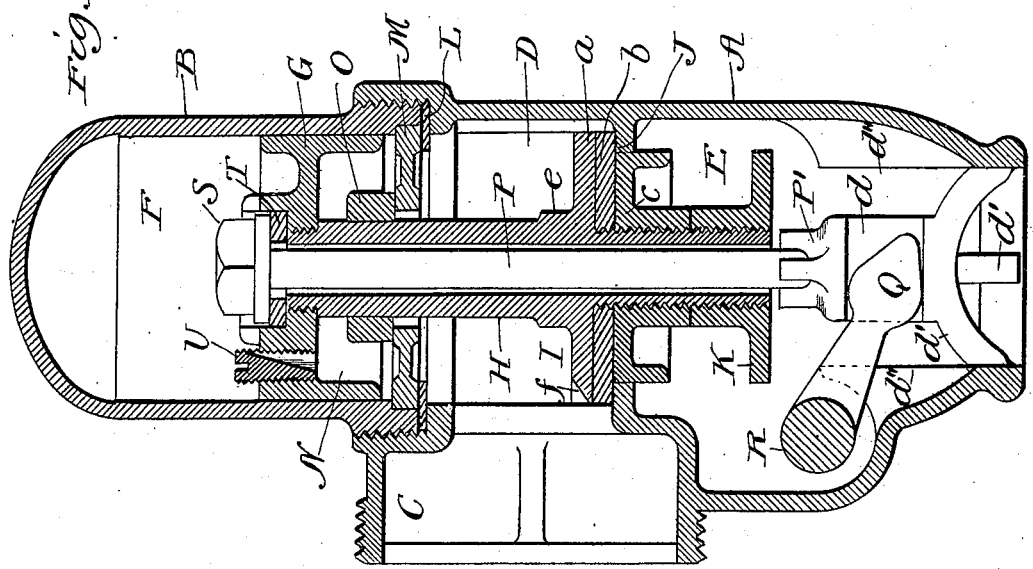
Witnesses:
Harold J Barrett.
Leonora Wiseman
Inventor:
Earl G. Watrous
By Edward Rector
his Atty.

UNITED STATES PATENT OFFICE.

EARL G. WATROUS, OF CHICAGO, ILLINOIS.

WATER-CLOSET VALVE.

SPECIFICATION forming part of Letters Patent No. 710,128, dated September 30, 1902.

Application filed December 26, 1899. Serial No. 741,610. (No model.)

*To all whom it may concern:*

Be it known that I, EARL G. WATROUS, a citizen of the United States, residing at Chicago, in the county of Cook, in the State of Illinois, have invented a certain new and useful Improvement in Water-Closet Valves, of which the following is a description, reference being had to the accompanying drawings, forming part of this specification.

My invention has for its object simplified construction and increased efficiency of what are known as "slow-closing water-closet valves;" and its novelty will be hereinafter set forth, and particularly pointed out in the claims.

In the accompanying drawings, Figure 1 is a middle vertical section of the valve in closed position, and Fig. 2 a similar view showing a slight modification in the construction of the valve.

The same letters of reference are used to indicate identical parts in both views.

The casing of my improved valve is composed of a body portion A and the cap B, screwed into the upper end thereof. The part A of the casing is provided with a connection C for coupling the valve to the water-supply pipe and contains the inlet-chamber D and discharge-chamber E.

The cap B, whose interior F constitutes the retarding-chamber of the valve, is accurately formed to constitute a cylinder, within which works the piston G, having depending from it the hollow stem H, which carries the main valve I, coöperating with the annular seat J, formed within the body A of the casing. In the present instance this main valve consists of an integral disk or flange $a$, formed upon the piston-stem H, a rubber or fiber disk $b$, fitting against the under side of the flange $a$, and a flanged nut $c$, screwed upon the threaded lower end of the piston-stem H and serving to confine the disk $b$ between the nut and the flange $a$.

Screwed upon the extreme lower end of the piston-stem H, beneath the nut $c$, is a second flanged nut K, whose flange or disk is adapted to enter the valve-seat J and close the opening therein when the main valve is lifted to its uppermost position.

Confined between the extreme lower end of the cap B of the casing and an internal annular shoulder formed upon the body A of the casing is a packing-ring L, which projects inward beyond the casing and has resting upon it the outer edge of a circular diaphragm M, having a large central opening through which the piston-stem H extends. This diaphragm M is clamped in place between an internal annular shoulder formed in the cap B and bearing upon the upper surface of the diaphragm and the packing-ring L and supporting-shoulder beneath it.

The space N between the diaphragm M and piston G constitutes what I will term a "cushioning-chamber," whose outlet around the piston-stem H is controlled by a check-valve O, consisting of a ring or collar surrounding and loosely fitting the piston-stem and normally resting upon the upper surface of the diaphragm M.

Extending vertically through the hollow piston-stem H is a rod P, which has secured to its lower end a casting P', provided with a recess $d$, engaged by an arm Q, projecting from the operating rock-shaft R of the valve, said shaft being adapted to be rocked either by means of a handle or by a suitable connection with the closet-seat. The casting P' is provided at its lower end with wings $d'$, which coöperate with ribs $d''$ upon the casing to guide the parts in their vertical movements.

The rod P has a nut S screwed upon its upper end and constituting a check-valve controlling communication between the retarding-chamber F and discharge-chamber E through the hollow piston-stem, said valve seating upon a fiber or rubber ring T, located in a circular recess formed in the upper side of the piston G.

A by-pass formed in a screw U, passing through the piston G, connects the retarding-chamber F with the cushioning-chamber N, the size of the by-pass being regulated by adjustment of the screw.

Immediately above the main valve I the piston-stem H is provided with an enlargement $e$, adapted to enter the central circular opening in the diaphragm M at the end of the upward movement of the valve for a purpose hereinafter explained.

Under the above described construction and arrangement of parts the operation is as follows: With the valve at rest in closed position the water from the supply-pipe entering and filling the inlet-chamber D will pass thence upward through the opening in the diaphragm M, controlled by the check-valve O, to the cushioning-chamber N and thence through the by-pass U in the piston to the retarding-chamber F, so that all three of the chambers D, N, and F will be filled with water under pressure. When the shaft R is rocked and its arm Q thrown upward to lift the valve, the rod P will move upward a slight distance before the upper end of the casting P' contacts with the lower end of the piston-stem and begins to move the piston and main valve. This initial independent movement of the rod P will lift the check-valve S from its seat and open communication between the retarding-chamber F and discharge-chamber E through the hollow piston-stem, thereby relieving the pressure above the piston and permitting free upward movement of the latter. As the main valve is lifted from its seat and the piston moved upward in the cap B the cushioning-chamber N will be enlarged and the water will pass upward from the inlet-chamber D past the check-valve O and fill it, while the water above the piston will pass downward through the piston-stem and escape through the discharge-chamber at the bottom of the valve. When the parts reach their limit of upward movement, the upper surface of the main valve will abut against the under surface of the packing-ring L, while the disk K, carried by the lower end of the piston-stem, will be brought into the valve-seat J to temporarily cut off communication between inlet-chamber D and discharge-chamber E. Upon now releasing the parts and permitting them to descend the check-valve S will at once close communication between the retarding-chamber F and the hollow piston-stem, while the check-valve O will seat upon the diaphragm M and trap the water in the cushioning-chamber N, thereby blocking the downward movement of the piston G and permitting it and the parts carried by it to descend only as rapidly as the water can pass upward from the cushioning-chamber N to the retarding chamber F through the minute by-pass in the piston. During the entire descent of the piston and closing of the main valve, therefore, the movement of the parts is opposed and controlled not only by the partial vacuum in the retarding-chamber behind the piston, as usual, but by the resistance of the water in the cushioning-chamber in front of the piston, and the result is that a more perfect control of the closing movement of the valve is attained and any sudden movement or hammering of it upon its seat at the end of its closing movement entirely prevented.

The purpose of the enlargement $e$ of the piston-stem H is to cause it to partially close the passage through the diaphragm M as the valve approaches its upward limit of movement, and thereby cut off the free passage of the water from the inlet-chamber D to the cushioning-chamber N, thus trapping the water between the diaphragm M and upper surface of the main valve and forming a cushion to prevent the valve from forcibly striking the under side of the packing-ring L, which it would otherwise be liable to do, owing to the closing of the discharge-outlet of the chamber D by the disk K and the unequal pressure thereupon exerted in said chamber upon the under side of the main valve and the upper side of the disk K, the latter presenting considerably less pressure area to the water than the former.

To facilitate the initial starting of the valve at its closing movement, I provide the latter with a minute passage or slit $f$, which furnishes communication between the discharge-chamber E and the upper side of the valve when the latter is in its extreme upper position against the packing-ring L, and thereby prevents the resistance being offered to the initial downward movement of the valve, which is otherwise liable to occur.

The by-pass connecting the retarding-chamber F with the cushioning-chamber N may be formed in the wall of the cap B of the casing or may consist simply of leakage-way around a loose-fitting piston; but to provide for regulation of the size of the by-pass it is more convenient to form it in a screw extending through the piston, as shown.

The valve illustrated in Fig. 1 is designed and equipped for automatic operation by the closet-seat, although, of course, capable of use as a hand-operated valve; but where it is to be employed only as a hand-operated valve the disk K for closing the valve-seat may be omitted and the parts otherwise modified, as shown in Fig. 2. In that view the fixed diaphragm or ring M and movable check-valve O of Fig. 1 are merged into a single element, the diaphragm itself being made vertically movable and constituting the check-valve proper, its integral hub or bearing-surface upon the piston-stem corresponding to check-valve O in Fig. 1. This modified check-valve in Fig. 2 seats upon the upper surface of the packing-ring L and in such position cuts off communication between the inlet-chamber D and cushioning-chamber N. It is permitted slight vertical movement, however, so as to allow the water to pass from the inlet-chamber to the cushioning-chamber at the upward movement of the piston and main valve; but at their downward movement it seats upon the packing-ring L again and traps the water in the cushioning-chamber N.

For the purpose of preventing the valve M' seating tightly against the annular shoulder which limits its upward movement, and thereby cutting off communication between the inlet and cushioning chambers when the valve is lifted as well as when it is seated upon the ring L, its upper surface is provided with notches $g$ around its edge to permit the upward passage of the water even when the valve is in upper position and bearing against the under surface of said shoulder.

Where the valve is to be automatically operated by the seat and is therefore provided with the disk K, which closes the main valve-seat during the time the main valve is held in elevated position by the depression of the closet-seat, I find the employment of the fixed diaphragm M and separate check-valve O of Fig. 1 to be preferable; but where the valve is hand-operated the arrangement shown in Fig. 2 is equally as efficient.

Having thus fully described my invention, I claim—

1. In a water-closet valve, the combination of valve-controlling piston operating at the closing movement of the main valve against the resistance of a body of water confined in a chamber in front of the piston, and a check-valve independent of the piston for controlling communication between the water-supply and said chamber and operating to permit such communication during the opening movement of the main valve and to cut it off during the closing movement thereof, substantially as described.

2. In a water-closet valve, the combination of a valve-controlling piston, an inlet-chamber, a cushioning-chamber located above said inlet-chamber and between the latter and piston, and a check-valve independent of the piston controlling communication between the inlet and cushioning chambers, substantially as described.

3. In a water-closet valve, the combination of inlet, cushioning and retarding chambers, a valve-controlling piston separating the retarding-chamber from the cushioning and inlet chambers, and a check-valve controlling communication between the inlet and cushioning chambers, substantially as described.

4. In a water-closet valve, the combination of inlet, cushioning and retarding chambers, a valve-controlling piston separating the cushioning and retarding chambers and provided with a by-pass directly connecting said chambers, and a check-valve controlling communication between the inlet and cushioning chambers, substantially as described.

5. In a water-closet valve, the combination of inlet, cushioning and retarding chambers, a valve-controlling piston separating the cushioning and retarding chambers, and a check-valve independent of said piston for controlling communication between the inlet and cushioning chambers, substantially as described.

6. In a water-closet valve, the combination of inlet, cushioning and retarding chambers, a valve-controlling piston separating the cushioning and retarding chambers and provided with a by-pass directly connecting said chambers, and a check-valve independent of said piston for controlling communication between the inlet and cushioning chambers, substantially as described.

7. In a water-closet valve, the combination of inlet, cushioning and retarding chambers, a valve-controlling piston separating the retarding-chamber from the cushioning and inlet chambers and provided with a by-pass directly connecting the cushioning and retarding chambers, and a check-valve independent of said piston for controlling communication between the inlet and cushioning chambers and operating at the closing movement of the main valve to cut off such communication and confine the water in the cushioning-chamber in front of the piston, substantially as described.

8. In a water-closet valve, the combination of inlet, cushioning and retarding chambers, a valve-controlling piston separating the inlet and retarding chambers, a check-valve controlling a discharge-outlet from the retarding-chamber, and a second check-valve controlling communication between the inlet and cushioning chambers, substantially as and for the purpose described.

9. In a water-closet valve, the combination of inlet, cushioning and retarding chambers, a valve-controlling piston separating the retarding-chamber from the cushioning and inlet chambers and provided with a hollow stem furnishing communication between the retarding-chamber and the discharge end of the valve, a check-valve controlling such communication, and a second check-valve controlling communication between the inlet-chamber and cushioning-chamber, substantially as and for the purpose described.

10. In a water-closet valve, the combination of inlet, cushioning and retarding chambers, a valve-controlling piston separating the cushioning and retarding chambers and provided with a hollow stem extending through the cushioning and inlet chambers and furnishing communication between the retarding-chamber and the discharge end of the valve, a check-valve controlling such communication, and an annular check-valve surrounding and sliding upon the hollow piston-stem and controlling communication between the inlet and cushioning chambers, substantially as and for the purpose described.

11. In a water-closet valve, the combination of inlet, cushioning and retarding chambers, a piston separating the cushioning and retarding chambers and having a hollow stem furnishing communication between the retarding-chamber and the discharge end of the valve, a rod extending through the piston-stem and connected at one end with the operating device for opening the main valve and carrying at its opposite end a check-valve controlling communication between the retarding-chamber and discharge-outlet of the valve, said rod being capable of slight longitudinal movement independently of the main valve and piston, and an annular check-valve surrounding the piston-stem and controlling communication between the inlet and cushioning chambers, substantially as described.

12. In a water-closet valve, inlet, cushioning and retarding chambers normally in communication with the water-supply and filled with water under pressure, a valve-controlling piston separating the retarding-chamber from the cushioning and inlet chambers, a check-valve controlling communication between the retarding-chamber and the discharge-outlet of the valve, and a second check-valve controlling communication between the inlet-chamber and the cushioning-chamber, substantially as described.

13. A water-closet valve comprising inlet, discharge, cushioning and retarding chambers, a piston separating the cushioning and retarding chambers and a main valve moving with said piston and controlling communication between the inlet and discharge chambers, a check-valve controlling communication between the retarding and discharge chambers, operating devices for opening said check-valve and lifting the main valve from its seat, and a check-valve independent of the piston for controlling communication between the inlet and cushioning chambers, substantially as described.

14. A water-closet valve comprising inlet, discharge, cushioning and retarding chambers, a piston separating the cushioning and retarding chambers and having a hollow stem extending through the cushioning and inlet chambers and furnishing communication between the retarding and discharge chambers, a main valve carried by said piston-stem and controlling communication between the inlet and discharge chambers, a check-valve controlling communication of the retarding-chamber with the discharge-chamber through the hollow piston-stem, operating devices for lifting the main valve from its seat and opening said check-valve, and an annular check-valve surrounding the piston-stem and controlling communication between the inlet and cushioning chambers, substantially as described.

15. The herein-described water-closet valve, comprising the casing A B containing the chambers E, D, N, F, the piston G separating the chambers N and F and having the hollow stem H, the main valve I carried by said stem, the rod P extending through said stem and connected at its lower end with the lifting devices for the main valve and carrying at its upper end the check-valve S, and the annular check-valve surrounding the piston-stem and controlling communication between the chambers D and N, substantially as described.

16. The herein-described water-closet valve, comprising the casing A B containing the chambers E, D, N, F, the piston G separating the chambers N and F and having the hollow stem H, the main valve I carried by said stem and provided with the by-pass or slit $f$, the rod P extending through said stem and connected at its lower end with the lifting devices for the main valve and carrying at its upper end the check-valve S, and the annular check-valve O surrounding the piston-stem and controlling communication between the chambers D and N, substantially as described.

17. The herein-described water-closet valve, comprising the casing A B containing the chambers E, D, N, F, the piston G separating the chambers N and F and having the hollow stem H provided with the enlargement $e$, the main valve I and disk K carried by the piston-stem, the rod P extending through said stem and connected at its lower end with the lifting devices for the main valve and carrying at its upper end the check-valve S, the diaphragm M separating the chambers D and N and provided with the central circular opening adapted to receive the enlargement $e$ of the piston-stem at the end of the upward movement of the main valve, and the annular check-valve O surrounding the piston-stem within the chamber N and seating upon the diaphragm M.

EARL G. WATROUS.

Witnesses:
EDWARD RECTOR,
LEONORA WISEMAN.